United States Patent [19]

Nicholson

[11] Patent Number: 4,901,367
[45] Date of Patent: Feb. 13, 1990

[54] CABLE COMMUNICATIONS SYSTEM WITH REMOTE SWITCHING AND PROCESSING CONVERTERS

[76] Inventor: Victor Nicholson, 5225 Pooks Hill Rd., Suite 1704-S, Bethesda, Md. 20814

[21] Appl. No.: 277,936

[22] Filed: Nov. 30, 1988

[51] Int. Cl.[4] .............................................. H04H 1/00
[52] U.S. Cl. .......................................... 455/5; 455/6; 358/86
[58] Field of Search ................. 455/3, 4, 5, 6; 370/85, 370/24, 25, 26; 358/86

[56] References Cited

U.S. PATENT DOCUMENTS 4,538,174  8/1985  Garzini et al. ......................... 358/86
4,673,976  6/1987  Wreford-Howard ................... 455/5

Primary Examiner—Donald O. Woodiel
Assistant Examiner—Frank M. Scutch, III
Attorney Agent, or Firm—James C. Wray

[57] ABSTRACT

A two-way cable distribution system for offices and office/apartment complexes wherein a single cable is used to interconnect tenants or owners with video/audio, facsimile, security and data services; with each user being allocated dual TV channels for the simultaneous transmission and reception of programs—all with complete privacy. User's multi-channel remote switching and processing converters (RSPC) are mounted in the switching control center where they also double as precision frequency controlled channel processors and eliminate problems of switching video crosstalk that occurs with IF or baseband switching. Spectrum capacity on each riser exceeds 800 MHz and enables more than 60 users per riser, each to be assigned 12 MHz bandwidth, without the need for line extenders amplifiers. Trunking of signals between buildings within a complex is not required because of riser transmissions that assign user drops in descending frequency along the length of the cable. Multiple subcarriers in the user's assigned spectrum transmit signals that control switching of channels in the RSPC and also switching of program sources such as videophone. The 12 MHz bandwidth allocated to each user's RSPC enables it to introduce a system whereby high definition TV (HDTV) can be transmitted to users that need not obsolete existing TV receivers. The addition of a limited number of video cassette recorders (VCR) at the switching control center enables home cable theater (HCT) with fine picture definition. Users would not require personal VCS's, merely use the remote control feature of their RSPC for impulse pay-per-view reception of films.

9 Claims, 5 Drawing Sheets

AOC c 1987

AUTOMATED OFFICE COMMUNICATION

INTERCONNECTION
CATV / SMATV / SATELLITE SYSTEMS
TERRESTRIAL MICROWAVE

AOC c 1987

INTERCONNECTION

PROGRAMS TO EXTERNAL SYSTEMS

INVERSE SPECTRUM DESIGN

CABLE COMMUNICATIONS SYSTEM WITH REMOTE SWITCHING AND PROCESSING CONVERTERS

SUMMARY OF THE INVENTION

The present invention provides a means for our society to improve its inter-office telecommunication capabilities by adding a visual dimension and emerging from the dark ages. There is a need for interactive transmission of high resolution pictures among offices wherein the parties have immediate access and complete privacy of service. Likewise, there is a need for the capability for facsimile service, not only of relatively low speed data, graphics and pseudo pictures; but also for high speed television quality pictures and, for some special applications, transmission of very high definition video.

A two-way cable distribution system for offices and office/apartment complexes uses a single cable to interconnect tenants or owners with video/audio, facsimile, security and data services. Each user is allocated dual TV channels for the simultaneous transmission and reception of programs—all with complete privacy. User's multi-channel remote switching and processing converters (RSPC) are mounted in the switching control center. The RSPC's also double as precision frequency controlled channel processors and eliminate problems of switching video crosstalk that occur with IF or baseband switching. Spectrum capacity on each riser exceeds 800 MHz and enables more than 60 users per riser, each assigned 12 MHz bandwidth, without the need for line extender amplifiers. Trunking of signals between buildings is not required because of riser transmissions that assign user drops in descending frequency along the length of the cable. Multiple subcarriers in the user's assigned spectrum transmit signals that control switching of channels in the RSPC and also switching of program sources such as videophone.

The Automated Office Communication (AOC) system builds on the Bidirectional Unicable Switching System (BUSS), Patent 4,077,006, by (1) expanding its capabilities for office and apartment distribution, (2) making it economically feasible using the innovative combined functions of each user's remotely controlled RSPC for channel selection and signal processing, and (3) providing novel program switching design in the Switching Control Center (SCC) that reduces greatly the number of switching interconnections of programs and eliminates the problem of video crosstalk by having interactive transmissions switched on their assigned RF frequency, and (4) restricting access to programs only to the authorized user.

Another AOC feature is the ability to have visual linkage of business executives directly from their own offices to branch offices or clients in other areas. This reduces the need for travelling, an inefficient use of time that can be unproductive, costly and stress producing. The AOC dual channel design permits simultaneous transmission and reception of videophone in living color. Pictures and sound are received on a standard unmodified TV set, which enables the equivalent of face-to-face meetings at low cost.

Office and AOC herein are used by way of example. The present system and devices may be used by any subscribers, residential or commercial. Users herein are described for convenience of the reader as "offices."

The present system uses "remote switching and processing converters" (RSPC's).

Channel converters (set converters) are used in the CATV and SMATV industries as a means of providing increased choice of television programming to individual cable subscribers. They also provide descrambling capability for various types of pay programming. They are located within or near the subscriber's residence so the subscriber can either manually or by means of an optical beam, remotely select TV channels. The present invention expands the capability of available set converters to add features such as remote switching, channel processing, wider bandwidth, precise frequency conversion, 12 MHz filtering and high level output.

In the present Advanced Office Communication, RSPC channel converters are used to provide, not only a choice of entertainment programming but also a choice of video/audio/data programs from other subscribers. Therefore they have the capability of being mounted remotely in a switching control center (SCC) that can be several miles distant from the subscriber. The subscriber's hand-held remote control has far more choices of program selection as a result of the converter base unit being mounted in the distant Switching Control Center.

Switching is at RF rather than IF. AOC design uses RF switching of television channels rather than (41–47 MHz) IF switching of channels as recommended in the BUSS system. The RF channel selection can use a TV tuner with 120 channel capability to reduce the need for external switching by a factor of 120 times as compared to the use of a system of external switching at IF or baseband video.

All incoming channels, whether entertainment, videophone, security, etc. are received on their transmitted spectrum for internal switching within the RSPC. This not only eliminates the need for hundreds or even thousands of external switches but also eliminates the crosstalk radiated between the hundreds of wires that use a common video or IF spectrum but have different modulations.

This RF switching also results in major equipment and labor cost savings from the elimination of the above-mentioned switches, associated filters and coaxial cables to the various switches. The only external switching required is to switch from the various categories of programs; for example, entertainment, pay services, education, security, videophone, satellite or governmental. External switching is not required for individual programs.

The 12 MHz bandwidth allocated to each user's RSPC enables it to introduce a system whereby high definition TV (HDTV) can be transmitted to users that need not obsolete existing TV receivers. The addition of a limited number of video cassette recorders (VCR) at the switching control center enables home cable theater (HCT) with fine picture definition. Users would not require personal VCR's, merely use the remote control feature of their RSPC for impulse pay-per-view reception of films.

The present invention provides multi-channel demodulation. The RSPC multi-channel processor demodulates each selected incoming television channel to baseband preparatory to remodulating it onto the allocated subscriber's channel. This contrasts with the cable industry's converters that convert each selected incoming television channel to another RF channel such as channel 3 or 4.

Demodulation to video/audio baseband is necessary to enable the ultimate delivery of television, videophone and video security programming to subscriber's TV sets within tight frequency tolerances and therefore to provide satisfactory pictures on their TV receivers. Cable industry set converters are less subject to this problem as their entertainment and other sources of programs maintain acceptable frequency tolerances, and these incoming signals are processed at the headend in equipment that uses phase-lock or crystal control of frequency. The Advanced Office Communication system interconnects users that provide their own cameras for videophone or security purposes, and many lower cost cameras do not incorporate NTSC synchronization of the television picture or accurate frequency control. Both factors could cause degraded reception on the receiver's TV. Therefore the RSPC converters demodulate all incoming signals to baseband preparatory to remodulating them to the allocated channel with precise frequency control.

Modulation onto a selected channel makes the signal available to a specific user. The baseband signals are internally amplified to prevent crosstalk interference to the various channels being processed in other converters. The amplified signal is then modulated onto the allocated channel within precise frequency tolerances using either phase lock or crystal control.

The subscriber's RF signal is then filtered to prevent interference to other outgoing signals. The processed program is then externally combined with other channels designated for the same feeder cable, amplified in a high output broadband amplifier and transmitted within a riser cable to office or apartment subscribers.

RSPC provides remote control. Program selection of individual channels at the RSPC input is controlled by digital signals emitted from the remote control unit at the distant subscriber location.

The remote control unit generates an RF carrier within the authorized channel plus two subcarriers of this carrier. Digital signals on one of the subcarriers control the switching of programs external to the RSPC. The other subcarrier controls switching of programs within the RSPC. For varactor tuners, the detected subcarrier level is used; for other tuners, digital signals modulate the subcarrier to control the channel selection process.

The RSPC's are combined signal processors and multi-channel set converters. A novel feature of the RSPC is that it combines the functions of a precise frequency headend processor and a multi-channel subscriber set converter within a single unit. The major cost savings enable video two-way between all subscribers.

These and other objects and features of the invention are apparent in the above and ongoing disclosure which includes the claims and the drawings.

DETAILED DESCRIPTION OF THE DRAWINGS

Figure 1:
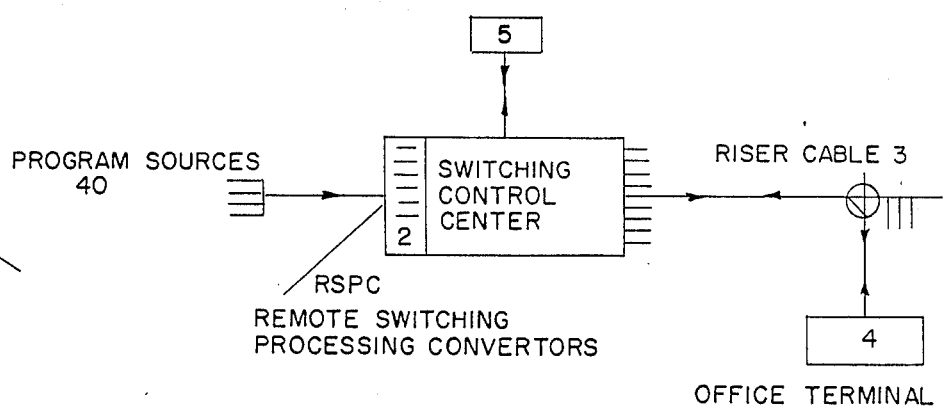
FIG. 1 is a diagrammatic representation of the switching control center (SCC), a cable, program sources and interconnection with external systems. At the SCC, each subscriber is assigned a remote switching processor converter which doubles in functions as a TV channel selector and a signal processor.

In the following detailed description and the drawings, like reference characters indicate like parts.

In FIG. 1 is shown a switching control center (SCC) 1 where remote switching and processing converters (RSPC) 2 receive signals from various program sources 40, select the requested program, process and convert it to a subscriber's allocated channel and transmit it via a coaxial distribution cable 3 to the allocated user's terminal 4. Likewise, programs and control signals are received at the SCC from other users for transmission of the programs to other users. In the SCC one RSPC is provided for each user. Multiple RSPC's are connected to each distribution cable. An interconnection center 5 is used to provide interactive applications via microwave or an external CATV system.

Figure 2:
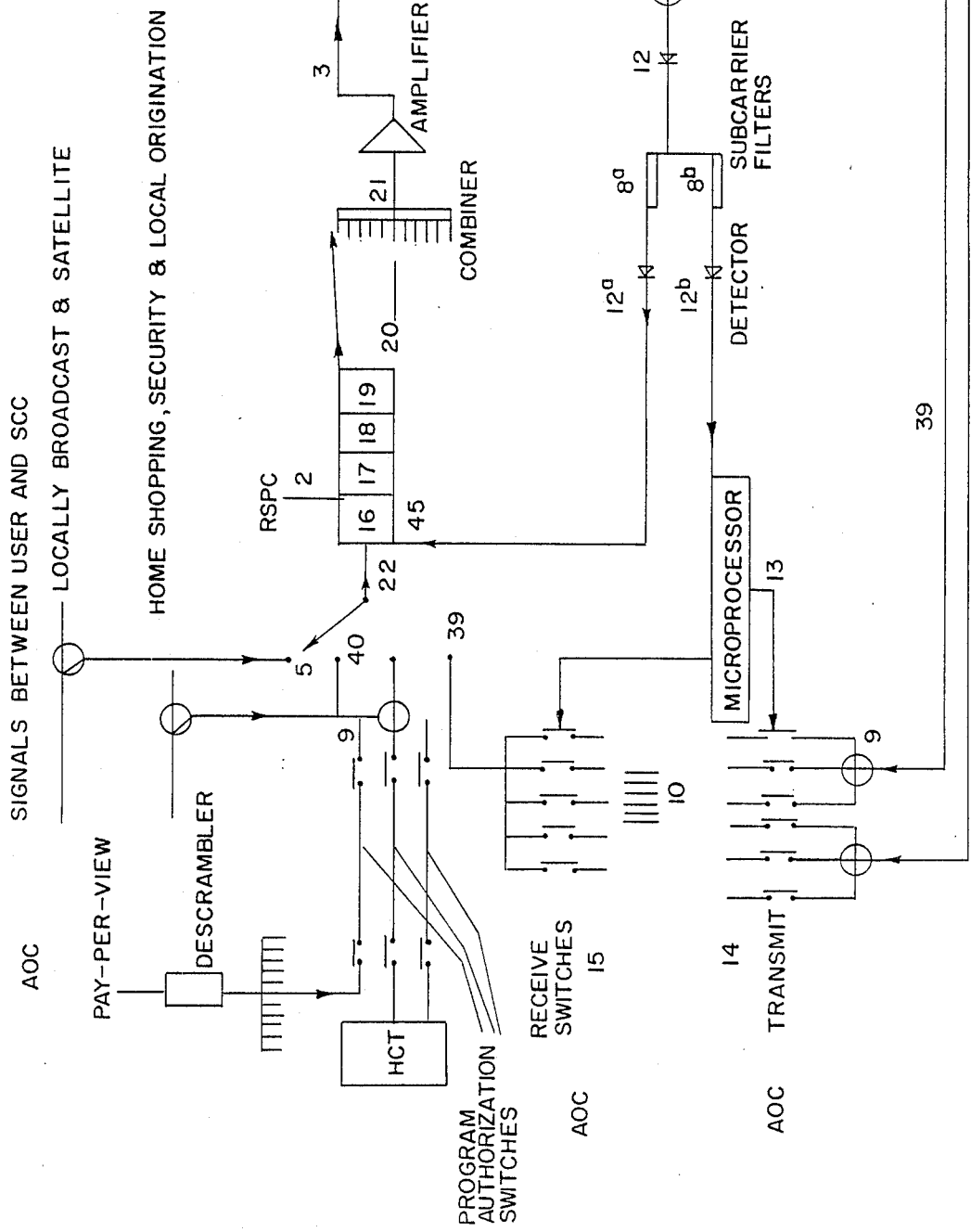
FIG. 2 is a diagrammatic representation of program and control signals transmitted from an office to the SCC for transmission of programs to other offices. Equipment operation functions for these signals are described.

In FIG. 2 is shown the operations within the SCC 1 in processing transmitted signals from user terminals. A directional coupler 6 is installed such that it receives signals 39 from user terminals to the SCC and attenuates signals from the SCC. Broadband amplifier 7 amplifies all signals on a distribution cable 3 from the user terminals to the SCC. Single channel filters 8 select the signals from a desired office to be processed. A two-way splitter 9 provides two paths, a) for programs to be sent to other offices 39, and b) to process control signals which are fed through the carrier filter 8a and 8b. These prevent detection of video, audio and picture synchronizing signals. The carrier is detected at 12, providing two subcarriers which are filtered 8a or 8b and detected 12a or 12b to generate the tuning and switching control signals.

Digital signals from one subcarrier, detected by 12a, control a channel selection processor within the RSPC. Digital signals from the second subcarrier 12b are fed to microprocessor 13 to control the switching of input program 5, transmit 14 and receive 15 switches. Within the SCC, interconnect cables 10 enable proper switch connections between respective return signals 39 and inputs 22 to user RSPC's.

Figure 3:
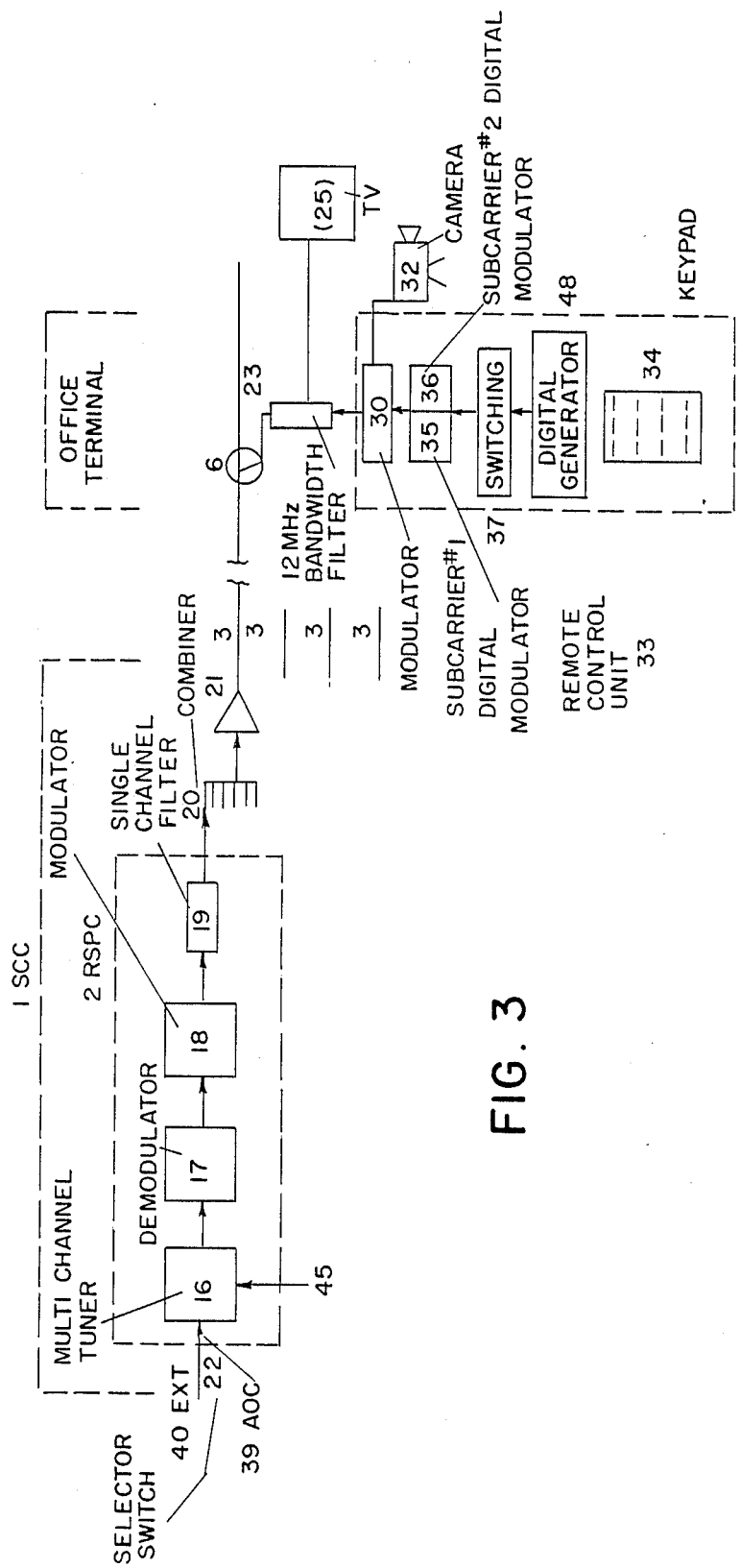
FIG. 3 is a diagrammatic representation of a subscriber's remote switching processor converter base unit at the SCC, showing the processing functions from signal sources to riser output.

FIG. 3 shows the functions of an RSPC 2. At the input, external program sources 40 or interactive programs 39 from other users are selected by switch 22 to be fed into the tuner 16 of RSPC 2. Remote individual channel selection is provided by the user control signals 45. The tuner's output is demodulated 17 and then remodulated and amplified 18 to the designated user's allocated channel. A channel-pass filter 19 prevents out-of-channel interference from degrading the output of other RSPC's feeding a given distribution cable 3 with the output a channel combiner 20 amplified in a wide band, high output post amplifier 21 to provide sufficient signal level for transmission to users. Several cables 3 may proceed from several amplifiers and combiners.

The remote control unit 33 of the RSPC is located at the user's terminal and includes a keypad 34 for program selection, a digital generator of pulses 48, switching capability 37 to select programs and direct transmissions. This operation is enabled modulating the pulses onto subcarriers 35 for tuner channel selection and 36 for receive and transmit switching. The subcarrier outputs are modulated 30 onto the user's assigned transmit channel in conjunction with other transmissions such as a camera 32. The output of 33 is fed back to the SCC 1 via a 12 MHz bandwidth filter 23 and directional coupler 6 onto cable 3 and transmitted to the SCC.

Figure 4:
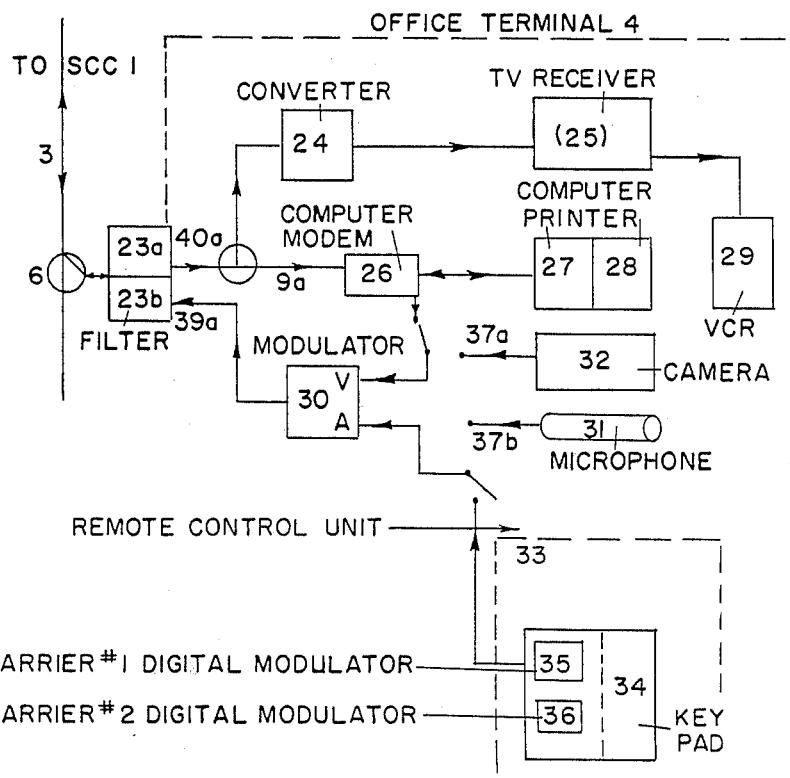
FIG. 4 is a diagrammatic representation of an office terminal, showing the transmission and reception of television and data interactive signals. Included is the remote control device that generates control signals for switching and channel selection at the SCC. For privacy, tap and dual filter are mounted external to office.

In FIG. 4 is shown typical equipment used in an AOC office terminal 4. Incoming programs 39 or 40 are received 40a and outgoing programs are transmitted 39a via the interactive distribution cable 3 to the SCC 1. Directional coupler 6 interconnects the cable with the dual channel filter 23 where incoming signals are fed to a two-way splitter 9a. Incoming signals are converted to a television channel in the single channel coverter 24 and fed to the TV set 25 and the video cassette recorder 29. Note that the converter 24 is only needed when the subscriber assigned channel is not within the channel tuning capability of the TV set.

The other output of splitter 9a feeds a computer modem 26, computer 27 and printer 28. Outgoing computer transmissions are fed to the modem 26 and to a switch 37a for connection to the video carrier connection V of the modulator 30 for the assigned transmit frequency. Alternatively the camera 32 video is switched onto this video carrier.

Likewise, either the digital signals from the keypad 34 of the remote control unit 33 or audio signals from the microphone 31 are connected via a switch 37b into the carrier input A of modulator 30, whose output 39a is fed to riser 3 through the transmit channel bandwidth of filter 23.

Remote control 33 consists of the keypad 34 to generate digital signals, two low frequency oscillators 35 and 36 to generate two subcarriers that are digitally modulated and connected to the carrier input A of modulator 30 as the subscriber's allocated transmit channel.

Figure 5:
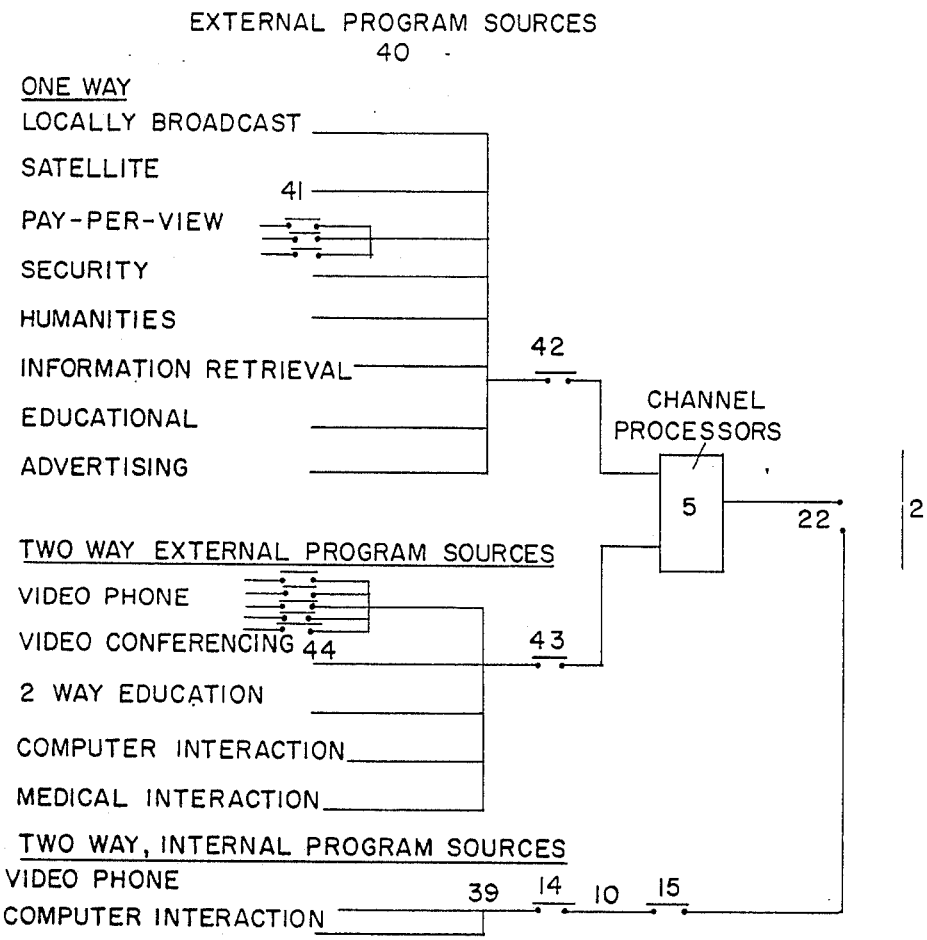
FIG. 5 is a diagrammatic representation showing how the remote switching processor converter channel selection capabilities are multiplied by the use of remotely controlled switches for various categories of one and two-way applications.

In FIG. 5 is shown the switching of external one and two-way program sources 40 and local office generated program sources 39. The one-way sources are connected to a bank 5 of single channel modulators and processors by way of switch 42. Switches 41 are used for individual control of movies and other pay programs.

Likewise, the two-way external source programs are connected to 5 by switch 43, with switches 43 providing individual video phone control. The internally generated programs from local offices need no additional processing and so signals 39 are directly connected to the desired RSPC 2 via a transmit switch 14, an interconnecting cable 10, a receive switch 15 and an external/internal program source switch 22.

Figure 6:
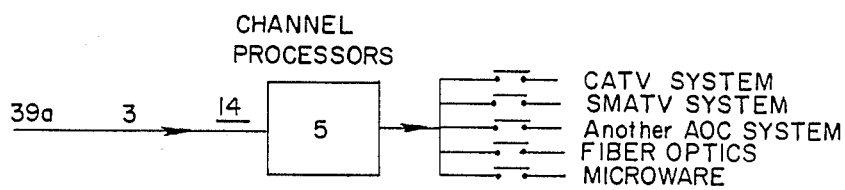
FIG. 6 is a diagrammatic representation of an interconnection headend for interfacing with external system channel allocation and equipment design.

FIG. 6 shows the signal flow from offices within a complex to those with whom they wish to interact in external locations. Signals 39a from each office are transmitted through cable 3 to their respective transmit switch 14 for processing in the interconnection bank 5 for processing onto the required channel for retransmission to the desired location via a CATV, SMATV, microwave or fiber optic link.

Figure 7:
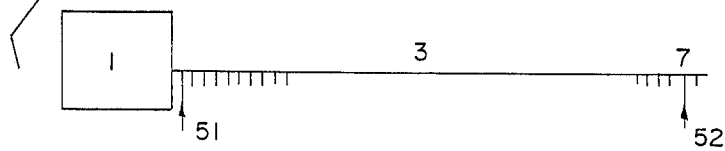
FIG. 7 is a diagrammatic representation from the SCC showing the allocation of channels on a distribution cable.

In FIG. 7 is shown a switching control center 1 with a riser cable 3 emanating from said control center. Using inverse spectrum design, the closest subscriber 51 is allocated the highest frequency channel spectrum of 794–806 MHz and the most distant office subscriber 52 is allocated the lowest frequency spectrum of 6–18 MHz. Other office subscribers on the riser cable are assigned channel spectrums in a descending order.

Figure 8:
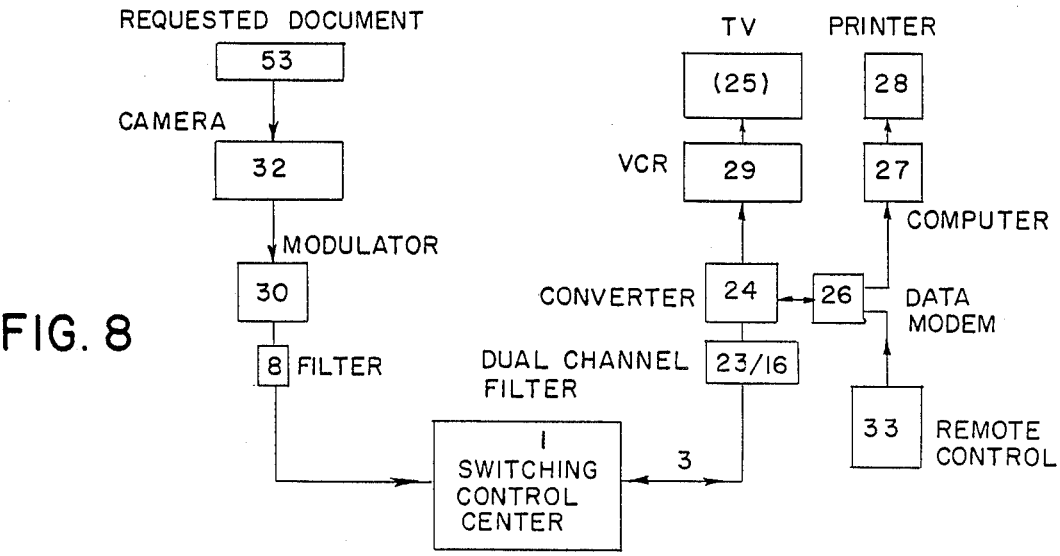
FIG. 8 is a diagrammatic representation of transmission of high speed facsimile between two offices connected via the SCC.

FIG. 8 shows an important design variation of the AOC system that provides high speed, wide band facsimile transmissions between two offices. A document is requested using remote control unit 33, feeding a data modem 26, whose output is converted in 24 to the assigned transmit channel and sent through dual channel filter 23 to cable 3 and SCC 1.

The requested document 53 is scanned by camera 32 with the resulting signal modulated 30 onto that office's requested transmit channel, then fed through filter 8 to the SCC 1. Here the signal is switched to the allocated RSPC for modulation to the user's channel and for transmission to the requesting office. The signal is selected in the receive section 23b of dual channel filter 23a, 23b, converted to the television frequency in converter 24, fed to data modem 26, computer 27 and printer 28. Simultaneously pictures are recorded on VCR 29 and observed on TV 25.

While the invention has been described with reference to specific embodiments, modifications and variations may be constructed without departing from the scope of the invention.

I claim:

1. A two-way, cable apparatus comprising:
   plural groups of program sources; and
   a switching control center having external switch means for switching a selected group of program sources, plural remote switching and signal processing converters into which are fed the selected group of program sources, the plural remote switching and signal processing converters are connected to a channel combiner by distribution cables and the channel combiner is connected to a broad band amplifier,
   wherein each of the plural remote switching and signal processing converters have an internal multi-channel tuner connected to the external switching means, a demodulator, a modulator to a selected channel and a channel filter connected in serial to one another, the channel filter being connected by a distribution cable to the channel combiner.

2. The apparatus of claim 1 further comprising external input program source selection switches connected to the multi-channel tuner for selecting input program sources as controlled by a remote subcarrier signal.

3. The apparatus of claim 2 further comprising internal program source selection switches connected to the multi-channel tuner for controlling interconnections between the multi-channel tuner and other user terminals.

4. The apparatus of claim 1 further comprising switching means in the switching control center external of the remote switching and processing converter and connected to the cables for switching signals from the user terminal to other remote switching and processing converters in the switching control center.

5. The apparatus of claim 1 further comprising an office terminal connected to the remote switching and processing converter by a cable and a directional coupler and a dual channel filter capable of receiving standard television or HDTV signals from the remote switching and processing converter and for having connected thereto means for creating signals for sending to the switching control center and having carrier signal means connected thereto and having subcarrier signal means connected to the carrier signal means for providing first and second subcarrier signals to control the switching of the remotely controlled multi-channel tuner in the remote switching and processing converter with the first subcarrier channel.

6. The apparatus of claim 5 in which the second subcarrier signal means controls switching means in the switching control center external to the remote switching and processing converter for controlling the provision of signals to the tuner.

7. The apparatus of claim 5 wherein the second subcarrier signal is provided with means in the switching control center external to the remote switching and processing converter for controlling the switching of the return signal from the user terminal.

8. The apparatus of claim 5 wherein the second subcarrier controls external switching in the switching control center to connect the tuner to a source of facsimile signals and wherein the dual channel filter in the user terminal is connected to a converter which is in turn connected to a VCR and display and which is connected to a computer and to a printer for printing facsimilies from the channel provided to the tuner according to the control of the first and second subcarrier signals.

9. The apparatus of claim 1 whereby internal modules of the remote switching and processing converter can encompass bandwidths of 12 MHz so as to enable the tuning, processing, modulation and amplification of high definition television signals (HDTV).

* * * * *